Jan. 3, 1933.  A. A. COLE  1,892,779
MOLD FOR MEAT PATTIES
Filed Jan. 13, 1932
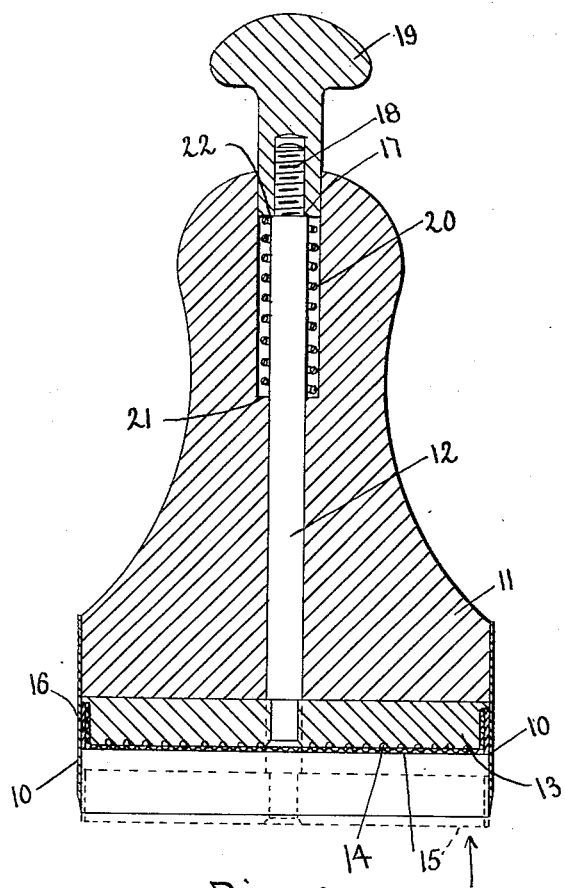
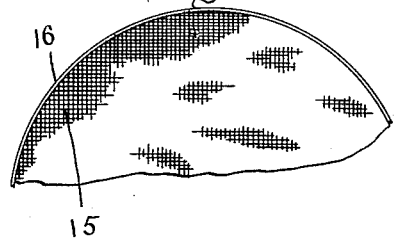
INVENTOR
Austin A. Cole Patented Jan. 3, 1933

1,892,779

UNITED STATES PATENT OFFICE

AUSTIN A. COLE, OF CAMBRIDGE, MASSACHUSETTS

MOLD FOR MEAT PATTIES

Application filed January 13, 1932. Serial No. 586,447.

My invention relates to molds such as are used for forming patties from Hamburger or other food materials of similar plastic nature.

One object of my invention is to provide a device by means of which patties may be formed rapidly from plastic meat balls or from the material rolled out into sheet form.

A second object is to provide a device of this nature which may be readily cleaned to maintain sanitary condition.

A further object is to provide a device that will produce patties of uniform shape from either meat balls or from the plastic sheet.

My invention consists in the novel combination of a mold and a plunger faced with foraminous material.

I have found that with molds commonly used for the purpose specified, that the patty when formed, adheres to the mold and especially to the major surface. Various means are employed to overcome this difficulty, such as a knife element to separate the plastic from the major surface, a plunger for forcing the patty from the mold, modifications of these means or other means for accomplishing the same purpose.

With my invention it is found that the plastic material does not adhere to the major surface, as a film of air prevents suction action to retain the plastic major surface in contact with that face of the mold, which in this case is a plunger face, the plunger being adapted to form the enclosed material and to expel it from the mold without adhesion.

The plunger face is formed preferably of wire netting of a mesh which will not permit the material to pass, and a film of air is entrained between the operating surface and the surface of the plunger that prevents a normal air pressure acting on the lower surface of the patty unbalanced by a counter pressure on the other face, thus preventing a suction action on the major operating surface.

The patty when forced from the mold, is thus readily released from the plunger without other releasing means.

In the accompanying specifications and claims, and the drawing forming a part thereof, I have described and illustrated a preferred form of my invention.

Referring to the drawing,

Fig. 1 is a sectional elevation of a molding device, emboding my invention.

Fig. 2 is a fragmental plan looking in the direction of the arrow, and showing the operating face.

In the drawing, the mold 10 is formed from a ring of thin sheet metal secured to the holder 11. Extending axially through the holder, is a stem 12, rigidly secured at one end to a plunger 13, which is axially and rotatively movable in the mold. I have formed the face of this plunger with grooves 14, and faced it with wire netting 15. This netting is secured in any suitable manner to the plunger, a preferred means being shown as a ring 16 pressed over a flanged portion of the netting.

The opposite end of the stem 12, is shouldered at 17, and the outer extension 18 is threaded to engage the tapped knob 19. Surrounding the stem is a spring 20 reacting on the shoulder 21 and the end of the shank 22 of the knob 19, to retain the plunger yieldingly in retracted position in the mold. When the patty is formed the mold may be withdrawn in most cases but should the plastic stick to the sides of the mold, it is only necessary to press on the plunger and force the patty from the mold when it will release from the plunger without further operation, as no suction action is present. I do not confine myself to this preferred form as modifications may be made within the scope of the appended claims.

Having thus described my invention, I claim:

1. In a mold for forming meat patties and having a plunger axially movable to expel the patty, the combination therewith of an element formed from wire netting secured to the plunger and constituting the operative major face of the mold.

2. In a mold for forming meat patties, a plunger axially movable therein provided with a grooved major face; an element formed from wire netting secured to and forming the operative face of the plunger, and the major face of the mold.

AUSTIN A. COLE.